United States Patent Office 2,739,505
Patented Mar. 27, 1956

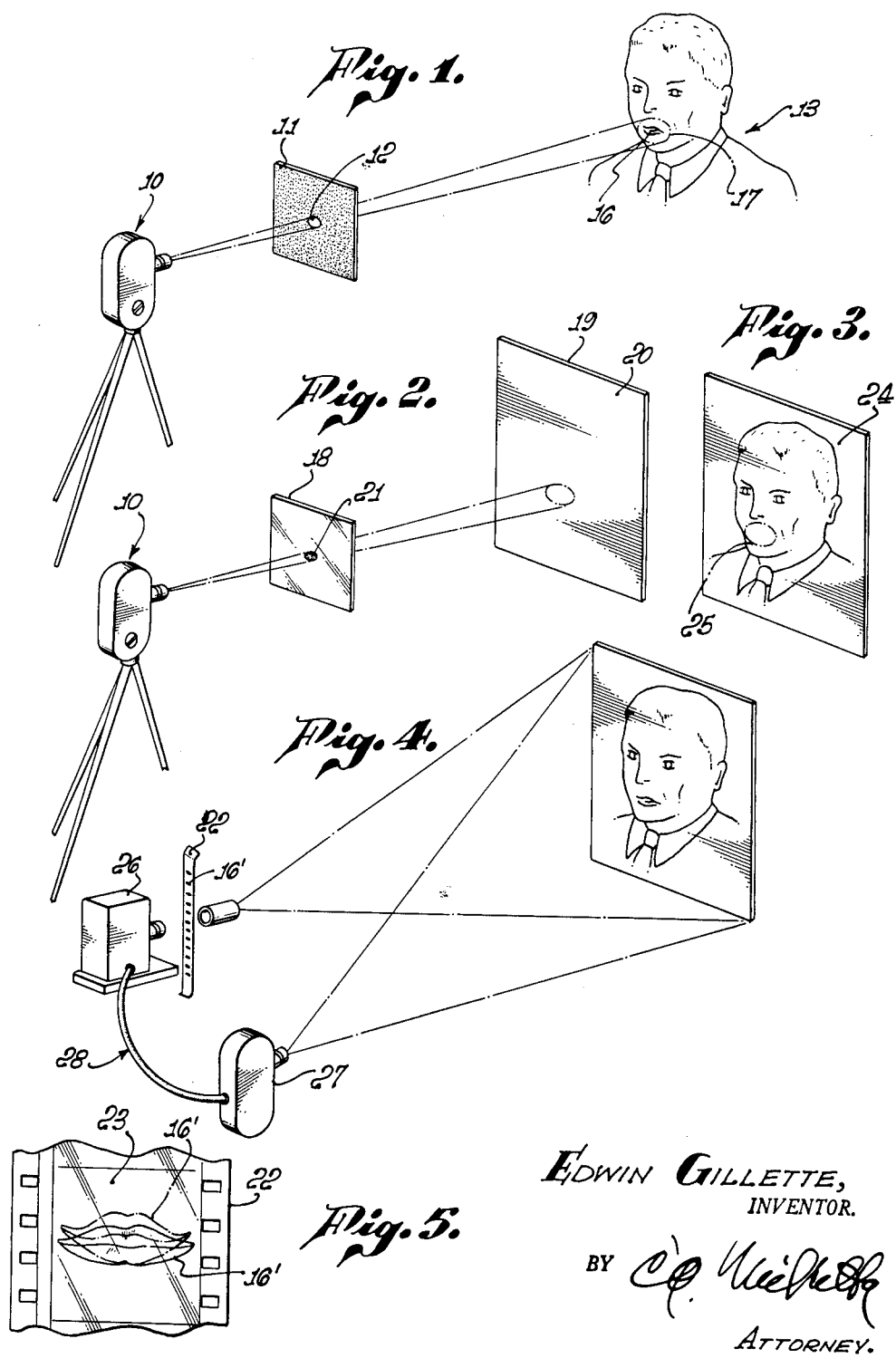

2,739,505
METHOD AND MEANS FOR PRODUCING COMPOSITE TALKING PICTURES

Edwin Gillette, Los Angeles, Calif.

Application February 4, 1952, Serial No. 269,868

8 Claims. (Cl. 88—16.2)

This invention relates to a method and means for producing talking pictures of an inanimate object or image provided with moving lips synchronized with a recorded voice.

Heretofore, inanimate objects, models or images have been made to appear to talk with simulated lip movements by first photographing the lip movements of an individual, projecting at intermittent intervals each successive lip position in detail upon a separate cell or card, copying lip position on a card and then drawing an object, figure, carton or animated character around each lip position in such a manner that the drawn lips were matched with the drawn object. The plurality of completed cards or cells were then photographed in proper sequence so that a motion picture film of an animated object or character was provided from rapid sequential exposure of the cards. Obviously, such a method is time consuming, tedious, and requires a great deal of precision and care in matching the successive lip movements with the remainder of the figure, model or image.

The method of the present invention does not require copying of lip movements in detail upon separate cells in order to produce moving lips upon an inanimate object, image or subject to be photographed. In the present invention, a composite image produced is composed of two mutually and virtually complementary parts. One of the parts may be an inanimate still object, model, or photographic image. The other complementary part is projected upon the inanimate image from which an area has been deleted virtually corresponding to the projected complementary part so that the composite object or image in appearance is complete. The method of the present invention provides novel means for making a film strip which contains only the complementary part to be projected upon the image or object in such a manner that a composite image is produced and may be made the subject of a composite motion picture film, may be directly viewed as when the composite image is provided on an advertizing billboard, or may be directly televised.

It is therefore a primary object of this invention to provide means and methods for producing an illusion of an audibly talking inanimate object, model, image, or subject desired to be photographed.

An object of this invention is to provide a novel method of composite photography wherein moving pictures of a selected lip area are projected upon an inanimate image so that the image will give the illusion of talking, and wherein the lips projected on the image move in accordance with words being spoken and audibly reproduced from the sound track of the composite motion picture film.

Still another object of this invention is to provide a method of making a composite talking image wherein virtually complementary parts are blended together in such a manner that the line of demarcation therebetween is not visually apparent and in which the requirement for precise and careful matching of adjacent complementary parts of the composite image is avoided.

Generally speaking, the method and means of this invention to create the illusion of a visibly apparent talking image includes deleting lip outlines and adjacent expression lines from a still image in a selected limited area and providing said area with a virtually blank portion which may have the same texture as the remainder of the face, projecting moving lips on the textured blank portion from a film strip having lips in film positive thereon while the film area surrounding said lips is transparent so as to illuminate the entire image from a single source of light, namely a projector light, and synchronizing sound with the movement of the projected lips so that an illusion is created of a still normally inanimate image visibly and audibly talking.

A further object of this invention is to provide a method of composite photography wherein a selected lip portion of an image is erased or deleted, and a complementary corresponding portion is projected on said deleted area in order to provide an entire illusory but understandable image having a selected lip area capable of moving in accordance with words spoken.

An exemplary method of this invention is described with respect to the production of a composite motion picture sound film.

Other objects and advantages of this invention will be readily apparent from the following description of the drawings.

In the drawings:

Fig. 1 is a perspective view in diagrammatic form illustrating one of the steps of the method of this invention.

Fig. 2 is a perspective diagrammatic view illustrating another step of this invention.

Fig. 3 is a perspective view of a photographic image from which a lip area has been deleted.

Fig. 4 is a perspective diagrammatic view illustrating the manner in which moving lips are projected upon the image of Fig. 3.

Fig. 5 is an enlarged fragmentary view of a film strip bearing the positive of lips projected on the image of Fig. 3.

The method and means of the present invention to produce a motion picture sound film of a composite subject to be photographed may include the step of first recording a voice in any suitable well-known manner. The voice recorded may, for example, recite a prearranged selected advertizing script appropriate to the composite subject to be photographed in order to create an unusual effect or illusion.

A final positive film strip containing a motion picture with synchronized sound of the composite subject to be photographed may be produced in the manner shown in Figs. 1-4 inclusive. In Fig. 1 is illustrated a diagrammatic arrangement including a motion picture camera 10 and a matte 11 operably positioned over the light admitting port of the camera. The matte 11 is opaque and may be made of any suitable non-light transmitting material. A selected area of the opaque matte 11 is provided with an opening 12 to permit passage of selected beams of light from an object being photographed to the port of the camera. The opening 12 is illustrated of oval form; it is understood that the configuration of the opening and the area thereof may be varied depending upon the object being photographed.

At a selected distance from the camera may be positioned an individual 13 preferably having his head supported and steadied by a suitable support or head rest so as to maintain virtually unchanged relationship to the camera 10. The lips 16 of the individual may be natural or may be made up in well-known manner so as to facilitate photographic reproduction thereof. Lip portions 17 surrounding the lips 16 may be made up in flat white make-up, such make-up being extended over onto portions of the face beyond those which are to be photographed.

The camera, individual and matte opening 12 are so positioned that light admitted through the port of the camera from the limited matte opening 12 will be virtually only that light reflected from lips 16 and a surrounding selected lip portion 17. When positioning the camera to photograph only the lips 16 and selected lip portion 17, the matte opening 12 provides a positive means to line up or position the image of the lips 16 upon the film. This may be readily done by sighting through the light admitting port of the camera through the matte opening 12 to the lips 16.

It is understood that other means may be used to photograph a selected lip or mouth area, one such exemplary means being that of providing a white sheet with a suitable opening cut therein and through which adjacently positioned lips of an individual may be photographed.

The recorded voice may then be played back while the lips 16 of the individual simulate pronouncement of the words spoken by the recorded voice or if desired a direct recording of the voice of the individual may be made. The movement of lips 16 are photographed on a motion picture strip film in synchronization with the recorded voice. A partially exposed negative film strip is thus provided wherein the only exposed area of the film is that upon which light admitted through the matte opening 12 impinged.

In Fig. 2, the camera 10 containing the partially exposed film strip is shown in diagrammatic relation to a matte 18 and a sheet of material 19 having an uninterrupted flat white surface 20 facing the camera. The matte 18 is virtually an identical complement to matte 11 and includes an opaque mask 21 of selected area of the same size and configuration as the matte opening 12. Mask 21 is located on matte 18 in the same relative position with respect to the camera as opening 12 is located on matte 11. The portion of matte 18 surrounding the opaque area 21 is clear and transparent to transmit all light rays reflected from the white surface of the sheet of material 19.

Unexposed portions of the partially exposed film strip are then exposed to light reflected from the white surface 20 of the sheet 19. Thus film strip portions which were not exposed in the step shown in Fig. 1 because of the opaque matte 11 are now exposed to the white surface of the sheet of material 19. The prior exposed lip portion of the film strip is not re-exposed because of the opaque mask 21. A completely exposed film strip showing only lips 16 is thus provided with the lip movements synchronized with the sound of a recorded voice.

The exposed film strip is then processed in well known manner to provide a positive motion picture film strip 22 indicated in Fig. 5 wherein the lips 16' are shown in detail while the surrounding film area 23 is clear and transparent. The photographed lips 16' include virtually all the detail, gradations of tone, expression, and movement of the lips 16 of the individual 13. The phantom lip lines in Fig. 5 illustrate movement of the lips.

In Fig. 3 is illustrated an exemplary photographic still image 24 or picture of any selected character. Instead of a photographic image 24, it is understood that any inanimate object, model, statuette, or other subject adapted to be photographed may be used in the method and means for making a composite motion picture of the present invention. For purposes of explanation, only image 24 will be referred to.

Image 24 may be any suitable photographic image reproduced in black and white or in color and provides a still background subject upon which moving lips 16' may be projected in virtually complementary relation. A selected expressive facial portion 25 which normally includes the lips and immediately adjacent lip portions may be blank; that is, the lip outline and expression lines of that portion of the image 24 are removed or deleted in any suitable manner. The blank facial portion 25 may be virtually the same shape and configuration as the opening in matte 11 and the opaque mask 21 in matte 18. It should thus be noted that image 24 with the blank facial portion 25 forms an inanimate, or non-moving part which is virtually complementary to lips 16' on the film strip 22 when the lips 16' are projected on the blank facial portion 25 to furnish the image with moving lips.

The blank facial portion 25 may be the color of the paper upon which the image is printed (normally white), or may be the color of the adjacent portions of the skin of the face of the image. Preferably, the blank portion is treated so that its texture and appearance virtually corresponds with the texture and appearance of immediately surrounding facial areas. For example, if the image was that of an individual with a dark skin color, the blank portion would also be given the appearance of dark skin color. In other words, lip outlines and expressive facial lines and shadows normally present in the lip and mouth area are deleted and removed to provide the blank portion.

Fig. 4 illustrates diagrammatically the steps of projecting lips 16' upon the blank portion 25 and photographing on motion picture film the composite subject thus provided. A motion picture film projector 26 may project the lips 16' on film 22 upon image 24, the image 24 and projector being so positioned that the lips 16' will be projected on the facial blank portion 25 in virtually complementary relation to image 24 to provide a composite subject. Light from the projector passes virtually unobstructedly through the clear transparent portions 23 of the film strip to illuminate image 24 while simultaneously projecting the lips 16' thereon. A motion picture camera 27 is suitably positioned in relation to the composite subject and may be interlocked with the projector 26 to operate in synchronism therewith. The projector 26 and camera 27 may be simultaneously started so that as the moving lips 16' are projected in complementary relation upon image 24, the composite subject including moving lips is photographed by camera 27 and a composite film strip is made. The film 22 is synchronized with the camera 27 by an interlocking means generally indicated at 28.

The composite film strip taken by camera 27 may then be processed in usual manner and combined with the recorded voice to provide a positive composite sound film showing an image, normally without animation, provided with moving lips synchronized in their movement to the pronunciation of the words being spoken by the voice recorded. Projection of the composite positive sound film upon a screen will produce the illusion of an image, object, or model audibly talking with moving lips in an expressive, unique manner.

The projected lips 16' may be made to virtually and apparently match the blank facial portion 25 of the image 24 by adjustment of the shape and area of the matte opening 12 and mask 21 in matte 18 so that the image 24 and the projected lips 16' will be virtually complementary. Since the blank facial portion 25 is textured to the same skin appearance as the immediately surrounding facial areas, projection of the moving lips thereon in virtually complementary relation from a single source of light, which simultaneously illuminates the image, provides a composite image in which the contiguous margins of the blank portion and projected lips do not define a visibly apparent line of demarcation between the complementary parts. Thus the matching of the complementary parts are not required to be precisely accurate.

In some cases, it may be desirable to include as a portion of the projected complementary lip part, some of the facial area immediately adjacent to the outline of the lips in order to project on an image expressive lines and shadows of the mouth and lip area. This may be readily accomplished by proper correlation of the matte opening 12, mask 21, and the blank facial portion 25.

While the exemplary embodiment of the method of this invention has been explained with respect to a photographic image, it is understood that moving lips synchronized with sound may be projected on a variety of subjects to be photographed. Obviously unusual lip effects may be created by the make-up applied to the lip area to be photographed and projected in complementary relation upon a subject.

The method of the present invention is particularly adaptable to the production of composite motion picture sound film utilized for advertising purposes, especially in connection with television commercial broadcasts.

It is understood that the composite image may be formed by projecting moving lips upon an advertising billboard or other means which bears an image having a blank facial lip portion so that the appearance to the eyes of passing observers will be that of an image talking. Likewise a similar advertising arrangement may be provided for direct transmission by television and thus eliminates the cost of preparing a composite motion picture sound film.

It is understood of course that various methods may be used to align the camera to photograph a selected lip area in order to properly position the lip image on the film strip.

All changes and modifications coming within the scope of the appended claims are embraced thereby.

I claim:

1. A method of making composite motion pictures comprising the steps of: surrounding lips to be photographed with white material; exposing a first film strip to only said lips and immediately adjacent white material; exposing the remainder of said first film strip to white material; making a positive of said exposed first film strip to provide a transparent positive film strip except for said lips; removing lip lines and expression lines adjacent thereto from an image to provide a blank portion of substantially the same shape and configuration as the photographed lips and adjacent expression lines; projecting the positive of said first film strip directly upon the blank portion and illuminating said image only by light transmitted through the transparent positive of the first film strip; and then photographing on a second motion picture film strip the image and the projected lips and expression lines.

2. A method of making a composite picture comprising the steps of: surrounding the subject matter to be projected and to be photographed with light-reflective material; partially exposing a film strip to only said subject to be projected and immediately adjacent light-reflective material; exposing the remainder of said film strip to light-reflective material; making a positive print of said film strip whereby said positive print is transparent except for said subject to be projected; removing feature and expression lines from an image to provide a blank area for projection thereupon of said subject to be projected; projecting said subject from said positive print upon said blank area; and simutlaneously illuminating the image and the subject being projected thereupon by light transmitted through the transparent positive print.

3. A method as recited in claim 1 including the step of synchronizing a recorded voice with said lips.

4. A method of making a composite motion picture film strip comprising the steps of: providing a facial area devoid of expression and feature lines on a still image lying in a plane and of selected size and configuration; projecting along a projection light path from a motion picture film strip only an animated expressive portion upon the facial area of said still image so as to take the place of said expression and feature lines deleted therefrom and to provide a complete image in the plane of the still image; simultaneously illuminating the still image by light directed along the projection light path; and photographing the still image and substituted animated expressive portion on a second motion picture film strip.

5. A method of making an illusory composite, understandably expressive image comprising the steps of: providing a selected limited blank facial area on a still image by deleting lip outlines and adjacent expression lines and features from said area; projecting upon said blank area only lip outlines and expression lines from a motion picture film strip transparent except for said lip outlines and expression lines while illuminating said image by light transmitted through transparent portions of said film strip whereby the illusion of a visually apparent complete image is created in the plane of said still image.

6. The method of making an illusory composite image adapted to be directly viewed by an observer, comprising the steps of: deleting lip outlines from a selected lip area upon a still image which lies in an image plane to provide a virtually blank area of selected size and configuration; projecting along a projection light path only moving lips from a motion picture film strip upon said blank area in virtually complementary relation to said blank area so as to substitute for the normally inanimate deleted outlines projected moving lips; and illuminating said blank area and said image by light following virtually the same path as said projection light path.

7. A method of making a composite motion picture film comprising the steps of: deleting from a selected facial area lip and expression lines from an image means to provide a blank portion of selected area and configuration and of the same texture and appearance as surrounding areas of the image; projecting only moving lips upon said blank portion of said image means to form a complete image; illuminating the image means and the projected moving lips by the light source of projector means projecting the moving lips; and photographing on a motion picture film strip the image means and projected moving lips.

8. A method of making an illusory composite understandably expressive image comprising the steps of: providing a selected limited blank area on a still image by deleting expression lines and features from said area; projecting along a projection light path upon said blank area only expression lines from a motion picture film strip transparent except for said expression lines; and simultaneously illuminating said image by light directed along said projection light path whereby the illusion of a visually apparent complete image is created in the plane of said still image.

References Cited in the file of this patent

UNITED STATES PATENTS

| 833,448 | De Vall | Oct. 16, 1906 |
| 1,574,464 | Bartholowsky | Feb. 23, 1926 |
| 1,610,410 | Baker | Dec. 14, 1926 |
| 1,690,039 | Schufftan | Oct. 30, 1928 |
| 1,858,767 | Dunning | May 17, 1932 |
| 2,008,938 | Tolhurst | July 23, 1935 |
| 2,075,198 | Henze | Mar. 30, 1937 |
| 2,127,656 | Terry | Aug. 23, 1938 |
| 2,181,405 | Kosa, Sr. | Nov. 28, 1939 |
| 2,309,390 | Grossguth | Jan. 26, 1943 |
| 2,501,958 | O'Brien | Mar. 28, 1950 |

FOREIGN PATENTS

| 585,759 | France | Dec. 17, 1924 |